Jan. 30, 1923.

V. HEINRICH.
FENDER.
FILED AUG. 8, 1922.

1,443,362

VALENTINE HEINRICH
INVENTOR.

BY R. W. Smith
ATTORNEY.

Patented Jan. 30, 1923.

1,443,362

UNITED STATES PATENT OFFICE.

VALENTINE HEINRICH, OF LOS ANGELES, CALIFORNIA.

FENDER.

Application filed August 8, 1922. Serial No. 580,406.

*To all whom it may concern:*

Be it known that I, VALENTINE HEINRICH, a citizen of the United States, residing at Los Angeles, county of Los Angeles, State of California, have invented new and useful Improvements in Fenders, of which the following is a specification.

This invention is a fender adapted for use upon a motor vehicle, and has for its object the provision of a construction forming an adequate guard for the front of the vehicle, and including an extension adapted to protect the headlights of the vehicle without interfering with the projection of light therefrom.

It is a further object of the invention to provide a fender structure including an extension as thus set forth, in which said extension is a bowed element supported at its respective ends by the main fender, in order to form a strong but simple device.

The invention will be readily understood from the following description of the accompanying drawings, in which.

Figure 1:
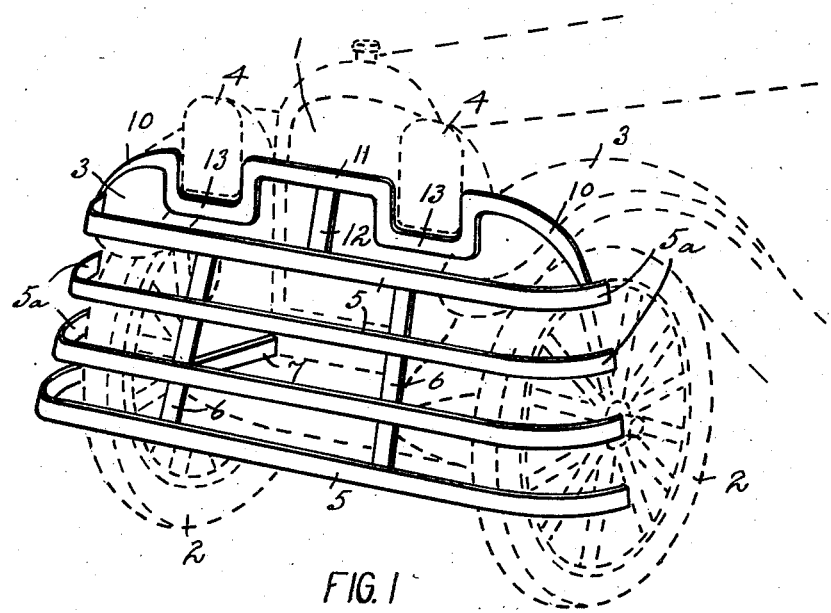
Fig. 1 is a perspective view showing an automobile with the fender in position thereon.
Figure 2:
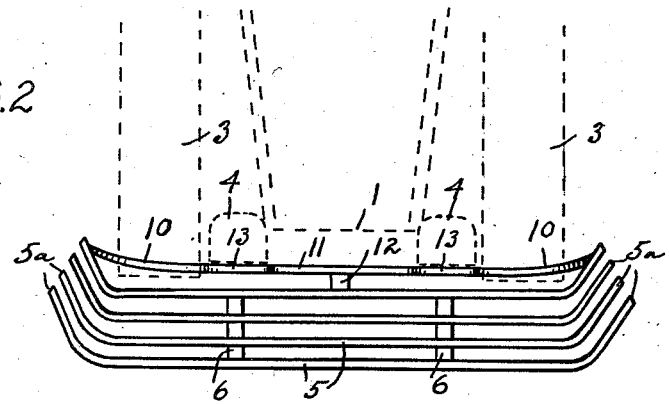
Fig. 2 is a plan view of the automobile and fender.

The automobile upon which the fender is mounted includes the radiator 1, front wheels 2 having mud guards 3, and headlights 4 adjacent the mud guards and at the respective sides of the radiator.

The fender structure comprises transverse bars 5, vertically spaced and connected by bars 6. The fender is mounted in position by supports 7, with bars 5 extending across the front of the vehicle below the headlights. The transverse bars have rearwardly turned ends 5ᵃ adapted to extend along the sides of wheels 2.

The fender structure as thus described forms a protection for that portion of the vehicle below the headlights, in the event of a collision, and also forms a guard for the protection of pedestrians in the case of accident. The fender also includes an extension for the protection of the headlights above the main portion of the fender.

This extension is a bowed transverse bar having its ends 10 connected to the rearwardly turned ends of the uppermost bar of the main fender, the medial portion 11 of the bow being spaced above the transverse bars 5. An upright bar 12 may connect the uppermost bar 5 with the bowed member.

The bowed extension is so arranged as to position its medial portion slightly in front of and opposite headlights 4, and at each headlight, said bow is formed with downwardly offset loops 13, extending around the lower part of the forward projection of the outline of said headlights.

By this arrangement the headlights are protected by said bowed element, while permitting the unobstructed projection of light. It will also be noted that use of a bowed member as said extension provides a strong and durable construction, and affords a simple and practical means for readily mounting said extension so as to be supported by the main fender.

It will be apparent that various changes may be made in the construction as thus described, without departing from the spirit of the invention.

What is claimed is:

1. The combination with a vehicle having headlights, of a fender comprising transverse bars extending across the front of said vehicle below said headlights, and an extension supported by said fender bars and extending across the front of said vehicle above said fender bars and at said headlights, said extension having offset portions extending around said headlights.

2. The combination with a vehicle having headlights, of a fender extending across the front of said vehicle and having offset portions extending around said headlights with a portion of said fender in the space between said headlights.

3. The combination with a vehicle having headlights, of a fender extending across the front of said vehicle below said headlights, and a bowed extension having the ends of said bow connected to said fender, with the medial portion of said bow extending across the front of said vehicle above said fender and at said headlights.

4. The combination with a vehicle having headlights, of a fender extending across the front of said vehicle below said headlights, and a bowed extension having the ends of said bow connected to said fender, with the medial portion of said bow extending across the front of said vehicle above said fender and at said headlights, said medial portion of the bowed extension having offset portions extending around said headlights.

5. The combination with a vehicle having headlights, of a fender extending across the front of said vehicle below said headlights and having rearwardly turned ends extending along the sides of the vehicle, and a bowed extension having the ends of said bow connected to the rearwardly turned ends of said fender with the medial portion of said bow extending across the front of said vehicle above said fender and at said headlights.

6. The combination with a fender having rearwardly turned ends, of a bowed extension having the ends of said bow connected to the rearwardly turned ends of said fender with the medial portion of said bow spaced above said fender, said medial portion of the bow having vertically offset portions adjacent the respective ends thereof.

7. A vehicle fender including a laterally extending bar having rearwardly turned ends and a laterally extending bowed extension above said fender bar and connected at its ends to said rearwardly turned ends of the fender bar.

In testimony whereof I have signed my name to this specification.

VALENTINE HEINRICH.